Oct. 19, 1954 D. H. TOTH 2,692,379
BLOCKING OSCILLATOR MAGNETIC RECORDING DEVICE
Filed May 27, 1952 2 Sheets-Sheet 1
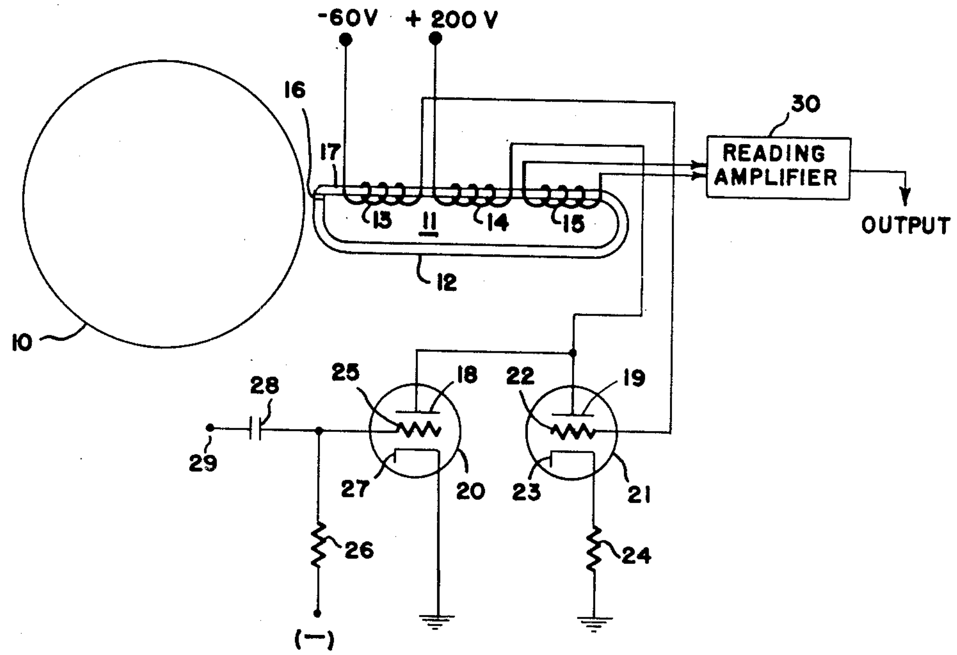
FIG. I.
INVENTOR
DOLAN H. TOTH
BY George Lipkin
B. L. Zangwill
ATTORNEY Oct. 19, 1954 D. H. TOTH 2,692,379
BLOCKING OSCILLATOR MAGNETIC RECORDING DEVICE
Filed May 27, 1952 2 Sheets-Sheet 2

INVENTOR
DOLAN H. TOTH
BY George Lifkin
B. L. Zangwill
ATTORNEY

Patented Oct. 19, 1954

2,692,379

UNITED STATES PATENT OFFICE 2,692,379

BLOCKING OSCILLATOR MAGNETIC RECORDING DEVICE

Dolan H. Toth, Spring Lake Park, Minn., assignor, by mesne assignments, to the United States of America as represented by the Secretary of the Navy Application May 27, 1952, Serial No. 290,310

4 Claims. (Cl. 340—174)

This invention relates in general to magnetic recording devices and in particular to devices for recording pulse type signals.

In numerous instances where the storage of electrical signals, particularly those in binary form, is required it is desired to have recording apparatus which is of simple design both mechanically and electrically and yet which is capable of uniform, reliable operation. Most prior art recording devices require a rather complex line-up of amplifies, pulse shapers and what not which generally falls far short of what is desired for a compact, light-weight installation.

Storage of binary signals is frequently encountered due to the widespread use of information in binary digital form in present day calculation and computation apparatus. Where binary digital notation is employed, each digit has two possible values (0 and 1) as contrasted to the more familiar decimal digit system where each digit has ten possible values (from 0 to 9). Binary notation is ideally suited to electrical manipulation because the two values of each digit may be represented merely by positive and negative polarity signals and independent of amplitude or even by the mere presence of a signal at a specified instant. Thus electrical flip-flop circuits, such as multivibrators and the Eccles-Jordan circuit, having their usual two conductive conditions, can represent the two values of a binary digit. In virtually every computer problem it is necessary at some part of the operation to store the signals obtained at one step in the process for use at some later date. It is at this point that storage of signals in binary form may typically enter and in so doing gives the computer the seemingly human capacity of memory.

The present invention provides a magnetic recording apparatus for recording binary type signals on a storage medium in which a blocking oscillator type electrical circuit is employed as a pulse recording energy generator. The coupling transformer employed in this blocking oscillator circuit has a short gap in the core thereof, the gap being placed in proximity to the storage medium where signals are to be recorded. As the storage medium is moved relative to this gap, the "portion" thereof in proximity to the core gap at the time the blocking oscillator "pulse" will be magnetized. In playback of signals thus stored the magnetized "portions" are moved relative to the core gap and in proximity thereto, such action causing the production of flux in the core. To facilitate playback of stored signals, the blocking oscillator coupling transformer contains a playback winding which produces output signals whenever a magnetized portion of the storage medium is moved in close proximity to the gap in the transformer.

Apparatus for positioning the transformer with respect to the storage medium is described in the copending application of William J. Field and R. L. Perkins entitled "Magnetic Head and Mounting," filed on April 9, 1954, Serial No. 422,280.

It is an object of the present invention to provide a magnetic recording device for recording pulse type signals.

Another object of the present invention is to provide a magnetic recording device for pulse type signals which is characterized by small size and weight and extreme simplicity.

Another object of the present invention is to provide a magnetic recording head which is also a blocking oscillator coupling transformer.

Another object of the present invention is to provide a blocking oscillator coupling transformer which is also a magnetic recording head.

Other and further objects and features of the invention will become more fully apparent from the following description taken in conjunction with the annexed drawings, wherein:

Fig. 1 shows partly in schematic form a preferred embodiment of the features of the present invention.

Figure 2:
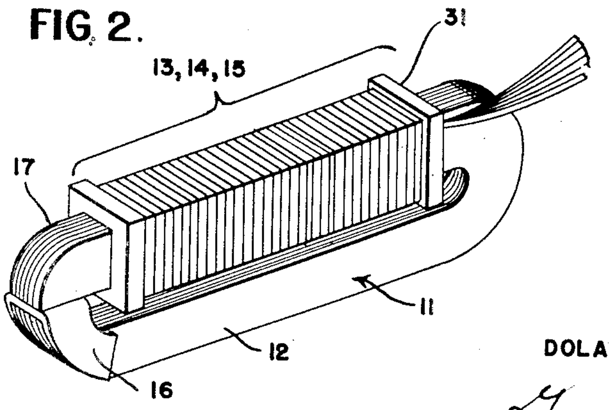
Fig. 2 shows details of a typical blocking oscillator transformer recording head.

Referring now to Figs. 1 and 2 of the drawing, there is shown a recording apparatus having a storage medium represented by a drum 10, the periphery thereof alone being indicated. It is to be understood that in the complete apparatus the drum 10 will be suitably journaled and driven by means not shown for rotation about an axis coinciding with the center of the periphery. Typically the storage medium may be a magnetic coating such as iron oxide spread on the cylindrical exterior of an aluminum drum.

Cooperative with the magnetic coating on the surface of drum 10 is a magnetic recording head 11 which, as shown in Fig. 1 and in more detail in Fig. 2, contains a core member 12, together with three windings, 13, 14 and 15.

The core 12 is in the form of an elongated oval approximately one inch long of highly permeable material having a gap in the flux path in which is disposed a thin shim 16 of highly conductive material such as silver foil to establish a definite gap length and change flux distribution in the gap. It is to be noted that the shim 16 is not inserted for the purpose of minimizing the effect of a D.-C. current in the winding but for the purpose of causing a fringing flux. When a magnetic field is set up in the core 12, the presence of the gap produces a leakage flux in that region which, if placed in sufficient proximity to the magnetic material on the surface of drum 10 will cause the magnetization of a tiny area or spot on the surface in the magnetic material. The thickness of the shim 16 is shown exaggerated in Fig. 2. At this point it may be noted that the shim 16, being a good conductor, experiences eddy current flow therein when the device is energized. These eddy currents reduce the flux density in the gap itself and increase the leakage or fringing flux extending into space beyond the confines of the gap. In other words, flux lines try to go around the silver foil rather than through it. Furthermore, as shown in Fig. 2, it has been found advantageous to extend the foil sides beyond the gap, affixing them to the sides of the curved leg of the core. This arrangement provides even greater useful fringing flux.

In a specific device it has been found desirable to place the recording head 11 so that there is a spacing of 0.002 inch between the surface of the drum 10 and the end of the head 11. Specifically, also, the foil thickness of 0.0015 inch has been found to be satisfactory. In this device the core 12 comprises a stack of ten oval-shaped laminations stamped from 0.007 inch thick Mu-metal in the shape indicated in the Fig. 2, and having preferably a straight leg 17 on which the windings may be placed.

Coils 13, 14 and 15 are wound upon a small bobbin or form 31 shown in Fig. 2 of suitable shape so as to be readily placed upon the straight leg 17 with a minimum distortion or bending of the stacked core. In the specific device described, the windings 13 and 14 may each comprise 350 turns of No. 42 AWG wire with the winding 13 being placed on top of the completed winding 14. The winding 15, consisting of 21 turns of No. 29 AWG wire, is wound on top of winding 13. The transformer is assembled by deflecting the core stack to allow the coils to slip over the straight leg. After assembly, the transformer outer end in the region of the gap is preferably honed to a uniform smooth surface. Such honing will improve recording and playback characteristics, however in many instances it may be eliminated by using great care in lining-up the laminations in assembly.

In the circuit itself, one end of winding 14 is connected to a source of positive potential, specifically of 200 volts, positive with respect to ground, while the other end of winding 14 is connected to the anodes 18 and 19 of tubes 20 and 21. Winding 13 has one terminal thereof connected to a biasing potential, indicated specifically as being 60 volts negative with respect to ground, whereas the other end of winding 13 is connected to the grid 22 of tube 21. The cathode 23 of tube 21 is connected to ground potential through a current limiting resistance 24. Tube 21 may be of a triode type such as half of a type 5687 tube, which is normally cut off at its plate voltage of 200 volts by the 60 volt biasing voltage, thus tube 21 is normally maintained non-conducting. Tube 20 is similarly maintained in a normally non-conducting condition by virtue of the return of the grid 25 thereof to a source of bias potential through a grid resistance 26 and the grounding of its cathode 27.

It is therefore seen that in the normal or quiescent state of this typical circuit, both tubes 20 and 21 are non-conducting so that there is no current flowing in the winding 14 and there is no magnetic flux in the core 12. Windings 13 and 14 are polarized in such a manner, or wound in such a direction, that the initiation of a current flow through winding 14 to the anodes 18 and 19 will induce a voltage in winding 13 of such polarity as to apply a positive polarity signal pulse to the grid 22. It is thus seen that this circuit is in effect a blocking oscillator type circuit with its anode and grid coupled regeneratively wherein the initation of current flow through winding 14 as by the unblocking of tube 20 will drive tube 21 to conduction producing an increase in current flow through winding 14 and a further reduction in the negative bias voltage applied to grid 22. This regenerative action continues until the tube or coupling transformer reaches saturation, at which time no further increase in anode current can be effective to raise the grid potential. When this occurs the field set up in core 12 by the flow of current through winding 14 collapses and the potential at grid 22 drops to such level as to terminate the flow of anode current in tube 21. Again this current change action is regenerative.

Tube 20 is in effect a trigger tube for the circuit, and though it is also normally non-conductive, the application of a positive triggering pulse to the grid 25 through coupling capacitor 28 from terminal 29, if of sufficient amplitude to momentarily unblock tube 20, will produce the necessary initiating current flow through winding 14. Once the blocking oscillator action of tube 21 is initiated, however, tube 21 becomes so highly conductive for the duration of the short pulse as to mask any further conductivity changes in tube 20. In many instances it may be desirable, however, that the coupling capacitor 28, together with resistance 26, form a short time constant or differentiating circuit to cause the application of very short duration pulses to grid 25.

Conventional blocking oscillator action of tube 21, therefore, produces short duration periods of intense flux in the core 12 and, because of the shim 16, also a strong fringing flux in the region of shim 16 in proximity to the storage drum 10. This leakage flux magnetizes the surface of drum 10 in a tiny spot as desired, to indicate one value for a binary digit.

For the purpose of signal playback, the winding 15 is placed on core 12. This winding is intended to sense small variations in the flux in core 12 produced when a previously magnetized spot on the surface of storage drum 10 passes in the vicinity of shim 16. Such a passage of a magnetized spot produces a flux change in the core 12 which in turn induces a voltage in winding 15. This voltage may be amplified by a suitable reading amplifier 30, which may be merely a two stage resistance-capacitance coupled amplifier. Amplifier 30 is connected to the output of winding 15.

It is thus seen that the apparatus component 11 provides in one compact device a magnetic recording head, a blocking oscillator coupling transformer and a playback head for the complete storage and reproduction of extremely short duration pulses.

Figure 3:
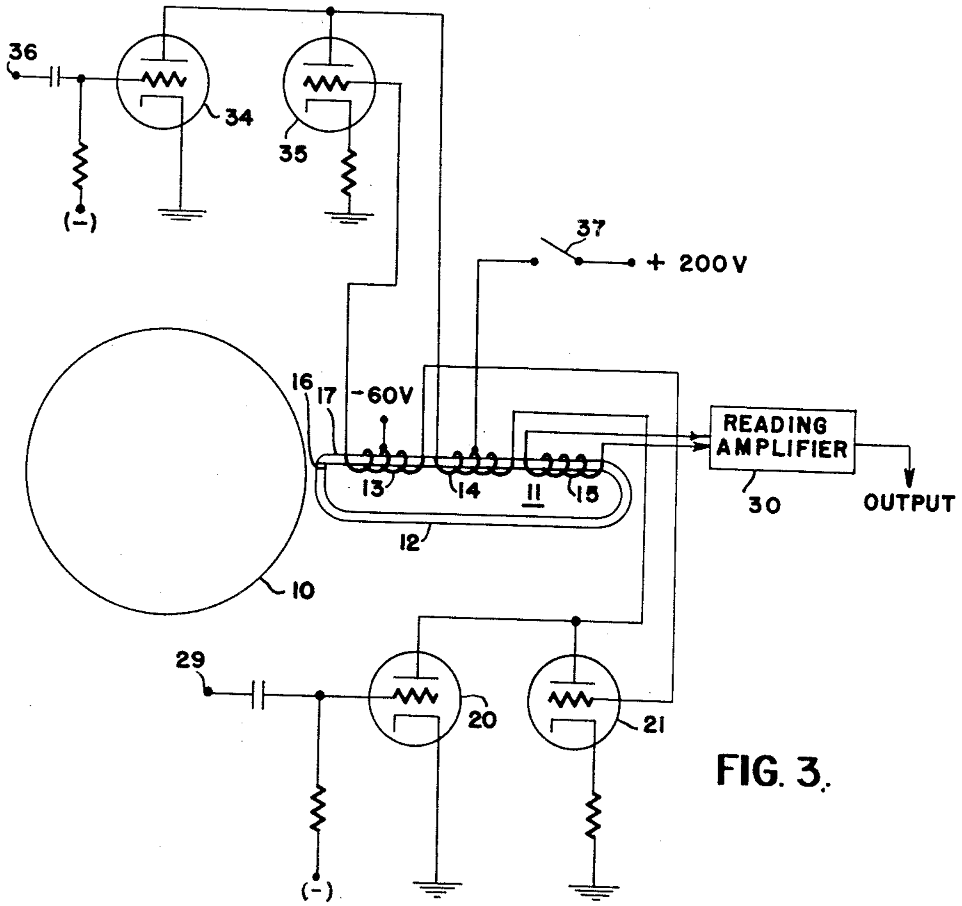
Fig. 3 shows a variant circuit embodying features of the present invention.

The type of storage thus far indicated is of the type where the two binary conditions are represented, one by the presence of a signal at a specified time and the other by the absence of a signal at a specified time. Such an arrangement is adequate in many instances, however there are other situations wherein positive recording in one polarity or the other is deisred. Such a situation is readily fulfilled by the typical apparatus of Fig. 3, which is basically similar to that of Fig. 1 with the exception that center tapped grid and plate windings and additional tubes are employed. This circuit has tubes 20 and 21 which operate with the transformer 11 as previously indicated. Additionally each winding 13 and 14 of transformer 11 has double the turns as its equivalent in Fig. 1, and a center tap, the center tap going to the potential sources. Tubes 34 and 35 are connected to the opposite ends of the windings in exactly the same manner as tubes 20 and 21 are connected. Thus a flux will be set up in one direction in core 12 when tube 21 becomes conductive and in the opposite direction when tube 35 becomes conductive. Signals of either polarity may be recorded depending upon whether terminal 29 or 36 receives an input signal.

Output signals as obtained from the reading amplifier 30 will be of either one polarity or the other depending upon the recorded signals rather than single polarity signals as with the apparatus of Fig. 1.

In some instances it may be desirable to provide a switch 37 in the anode circuit of the tubes to prevent conduction and accidental triggering thereof during playback. Normally such a precaution is unnecessary because the small induced playback voltages will rarely be of sufficient magnitude to bring either tube 21 or tube 35 to conduction. Also ordinarily there is no danger of cross triggering of the tube of one polarity by the operation of the tube for the opposing polarity.

The transformer-recording head combination in operation and with a recording surface lineal speed of 1600 inches per second can scan 128,000 "cells" or units one eighth inch wide by one eightieth inch long per second. Such a single cell passes under the head in 7.8 microseconds.

From the above description, it is apparent that many modifications and variations of the present invention are possible. It is therefore to be understood, that within the scope of the appended claims, the invention may be practiced otherwise than as specifically described.

What is claimed is:

1. Signal storage apparatus comprising, a signal storage medium, a blocking oscillator transformer having a core with a single gap therein and at least first and second windings on said core, said core gap being disposed in proximity to said storage medium, an electron tube having an anode, a cathode and a control grid, means connecting the first winding in the anode current path of said electron tube, means connecting the second winding to the control grid of said electron tube in regenerative polarity, biasing means for holding said electron tube non-conductive except at such times as conduction thereby is required for magnetizing a portion of the signal storage medium, and means for providing a relative motion between the storage medium and the blocking oscillator transformer core.

2. Signal storage apparatus comprising, a signal storage medium, a blocking oscillator transformer having a core with a single gap therein and at least first and second windings on said core, said core gap being disposed in proximity to said storage medium, an electron tube having an anode, a cathode and a control grid, means connecting the first winding in the anode current path of said electron tube, means connecting the second winding to the control grid of said electron tube in regenerative polarity, biasing means for holding said electron tube non-conductive except at such times as conduction thereby is required for magnetizing a portion of the signal storage medium, keying means for unbiasing said electron tube to permit conduction thereby, and means for providing relative motion between the storage medium and the blocking oscillator transformer core.

3. Signal storage apparatus comprising, a signal storage medium, a blocking oscillator transformer having a core with a single gap therein and first, second and third windings on said core, said core gap being disposed in proximity to said storage medium, an electron tube having an anode, a cathode and a control grid, means connecting the first winding in the anode current path of said electron tube, means connecting the second winding to the control grid of said electron tube in regenerative polarity, biasing means for holding said electron tube non-conductive except at such times as conduction thereby is required for magnetizing a portion of the signal storage medium, and means for providing relative motion between the storage medium and the blocking oscillator transformer core, said third winding on said core being inductively related to said first and second windings and the magnetic circuit of said core.

4. Signal storage apparatus comprising a signal storage medium, a blocking oscillator transformer having a magnetic core containing an air gap, said air gap being positioned adjacent said signal storage medium, first and second windings on said magnetic core, an electron tube having at least an anode, a cathode and a control grid, means connecting said first winding in the cathode-anode circuit of said electron tube, means connecting said second winding in the grid cathode circuit of said electron tube in regenerative relation to said first winding, biasing means for rendering said electron tube normally non-conductive, means for rendering said electron tube conductive in response to a signal, and means for producing relative movement between said signal storage medium and said magnetic core.

References Cited in the file of this patent

UNITED STATES PATENTS

| Number | Name | Date |
|---|---|---|
| 2,351,011 | Camras | June 13, 1944 |
| 2,475,421 | Camras | July 5, 1949 |
| 2,535,712 | Wolfe | Dec. 26, 1950 |
| 2,540,654 | Cohen et al. | Feb. 6, 1951 |
| 2,590,091 | Devol | Mar. 25, 1952 |
| 2,608,621 | Peterson | Aug. 26, 1952 |